Sept. 11, 1928.  
A. R. McARTHUR  
1,683,982  
APPARATUS FOR PACKING DOUBLED SHEETS AND PLATES  
Filed May 26, 1927   2 Sheets-Sheet 1

Witnesses:  
Edwin Trueb

Inventor:  
ARTHUR R. McARTHUR,  
by D. Anthony Usina  
his Attorney.

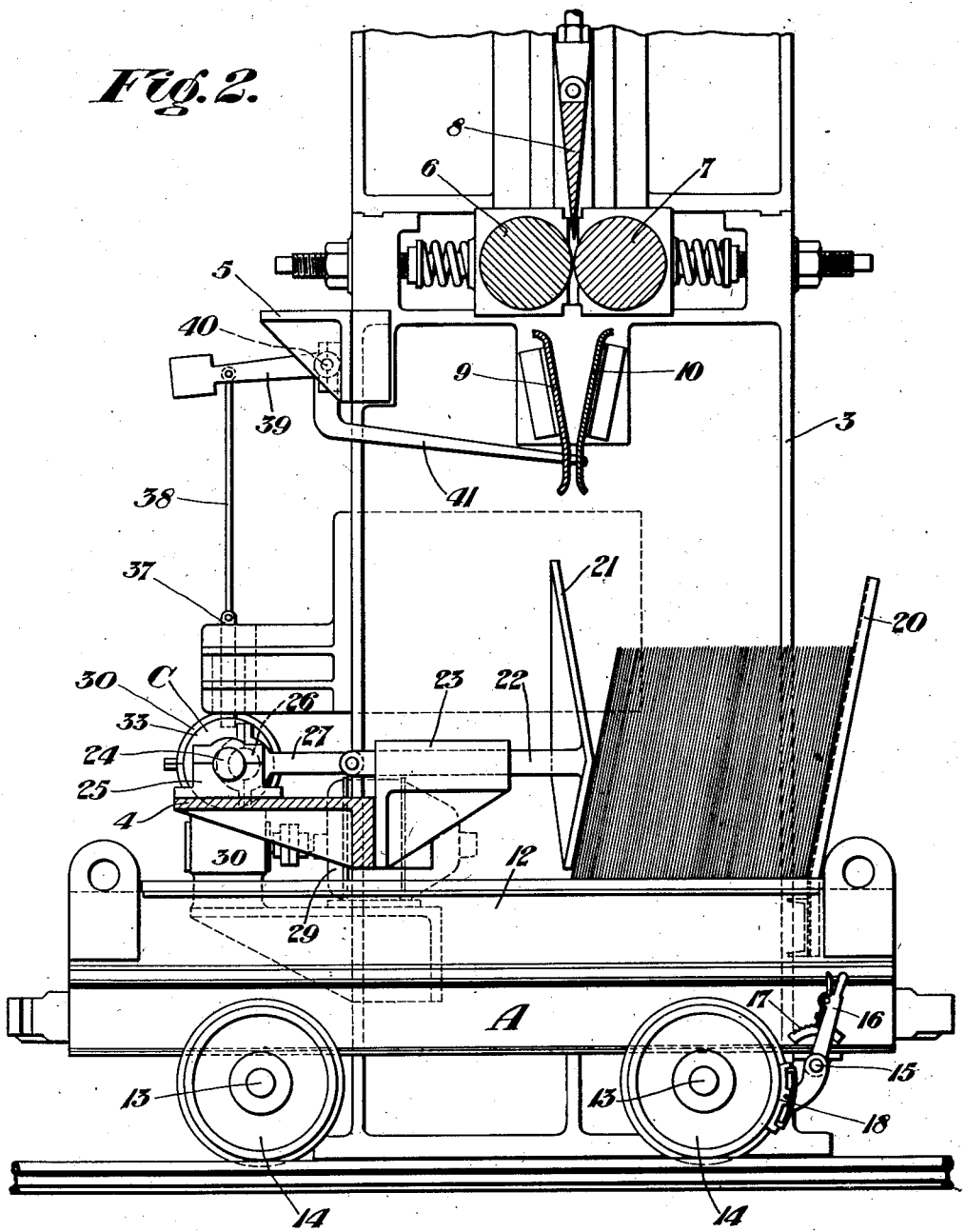

Patented Sept. 11, 1928.

1,683,982

UNITED STATES PATENT OFFICE.

ARTHUR R. McARTHUR, OF GARY, INDIANA, ASSIGNOR TO AMERICAN SHEET AND TIN PLATE COMPANY, OF PITTSBURGH, PENNSYLVANIA, A CORPORATION OF NEW JERSEY.

APPARATUS FOR PACKING DOUBLED SHEETS AND PLATES.

Application filed May 26, 1927. Serial No. 194,514.

This invention relates to doubling apparatus for doubling sheets or plates, and has for its object the provision of automatic means for packing the doubled sheets or plates in edgewise position on a wheeled carriage.

A further object is to provide an apparatus of the class described having the novel construction, combination, and design of parts hereinafter described, and illustrated in the accompanying drawings.

In the drawings—

Figure 2 is a sectional elevation taken on the line II—II of Figure 1.

Figure 1:
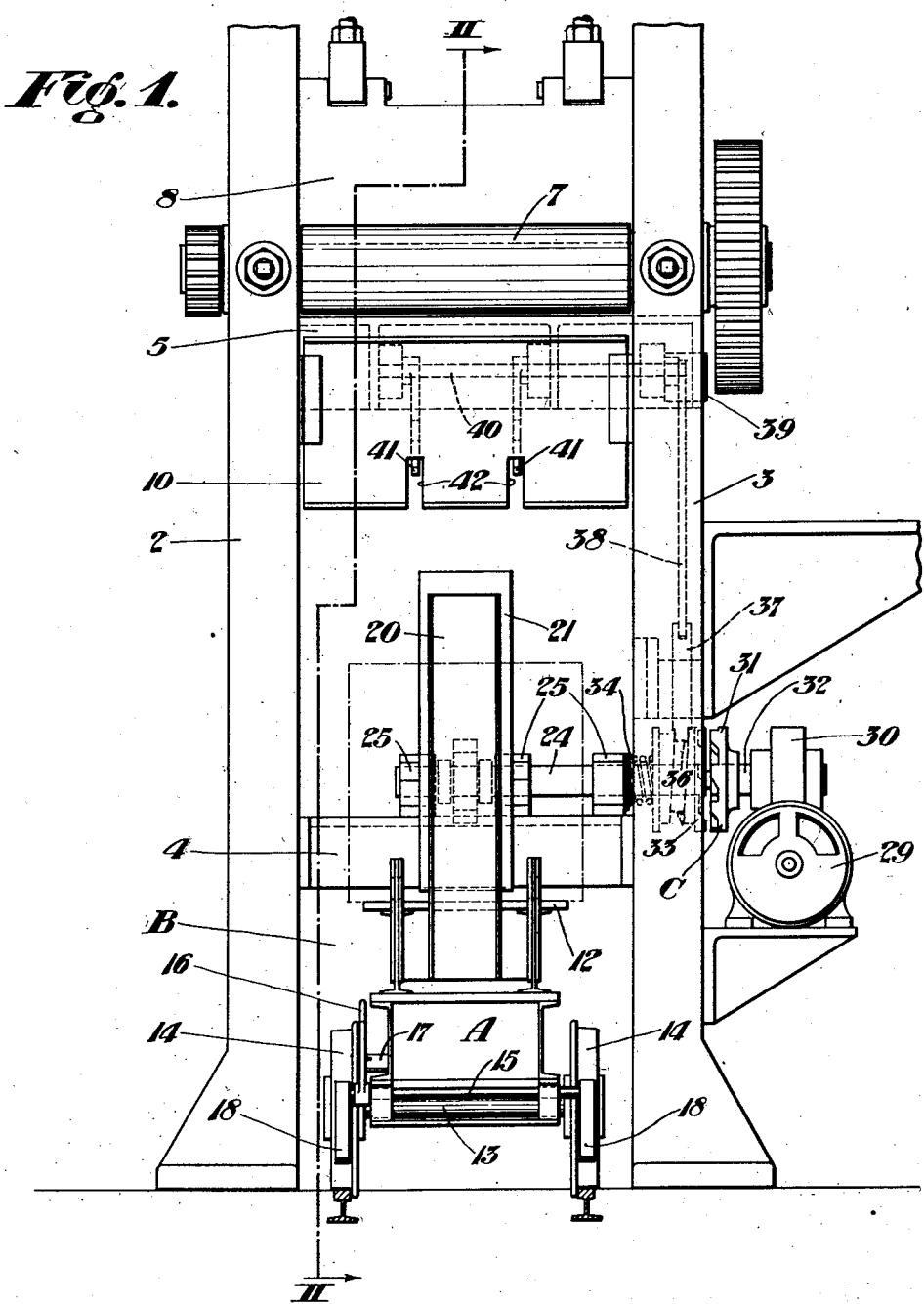
Figure 1 is an end view of the apparatus; the upper portion of the housings and doubler mechanism being omitted since it is standard mechanism and forms no part of this invention.

Referring more particularly to the drawings, the numerals 2 and 3 designate the doubler side housings which are spaced apart which are connected together by transverse members 4 and 5 and by other structural members adjacent their upper ends (not shown).

The sheets or plates to be doubled are passed between the housings 2 and 3 and are adapted to be forced down between a pair of doubling rolls 6 and 7 by the doubling knife 8.

A pair of guide plates 9 and 10 are arranged transversely between the housings 2 and 3 and are adapted to receive the doubled sheets or plates and guide them downwardly onto a wheeled carrier or truck A located in a passageway B, between the lower portions of the side housings 2 and 3.

The truck A comprises a flat chassis or body 12, axles 13, and flanged wheels 14. A hand brake mechanism is provided to frictionally engage the one pair of wheels so as to normally resist free movement of the truck, and comprises a brake shaft 15 journaled on the chassis 12 and provided with a hand operating lever 16 having a ratchet lock 17. A pair of brake shoes 18 are carried by the shaft 15 and adapted to engage the truck wheels. The brake mechanism is adapted to be set so as to retard the movement of the truck A and prevent coasting thereof while, at the same time, permitting the truck to move when force is applied thereto.

A sheet or plate stop head 20 is secured to the truck chassis 12 adjacent one end and extends upwardly therefrom, and is adapted to support the doubled sheets or plates in edgewise position as they are delivered onto the truck.

A packing member is provided for packing the sheets or plates forwardly toward the stop head 20, and comprises a head portion 21 and stem portion 22. The stem 22 is slidably mounted in a supporting housing 23 secured to the transverse member 4.

A crank shaft 24 is journaled in bearings 25 on the member 4 and has its crank portion 26 connected to the rear end of the stem 22 by a connecting rod 27. The shaft 24 is adapted to be operated by a motor 29 through a set of standard reducing gearings indicated at 30, and a clutch C.

The clutch C has one jaw member 31 fixed or keyed to the shaft 32 of the reducing gearing and its other jaw member 33 slidably mounted on the crank shaft 24 and normally urged toward the jaw member 31 by a coiled spring 34. The member 33 is provided with a spiral groove 36 in which a clutch operating pin 37 is adapted to ride to force and hold the clutch member 33 out of engagement with the member 31.

The pin 37 is connected by a connecting link 38 with a counter-weighted lever 39 secured to a rock shaft 40 journaled in bearings on the transverse member 5. A pair of operating levers 41 are secured to the shaft 40 and have their free ends extending through slots 42 in the guide plate 9 and into the path of the sheets or plates passing between the guide plates 9 and 10.

In operation, the carriage or truck A is backed into the passageway B between the housing sides 2 and 3 until the head 20 is close to or in contact with the packing head 21 and the brakes 18 are set to hold the truck against free movement from this position.

The doubler mechanism is then set in motion as is also the motor 29 for driving the crank shaft 24.

As a sheet or plate is doubled and forced through the rolls 6 and 7 it will pass between the guide plates 9 and 10 and trip the levers 41 which will rock the shaft 40 so as to raise the lever 39 and link 38 and thereby lift the pin 37 from the slot or groove 36 in the clutch member 33. As the pin 37 is lifted from the groove 36 the clutch member 33 will be forced into driving connection with the co-acting clutch member 31 by the spring 34, thereby causing rotation of the crank shaft 24 which in turn will reciprocate the packing head 21. As the head 21 is moved rearwardly the doubled sheet or plate will drop onto the carriage or truck immediately in front of the head 21, and the head 21 on its forward movement, will engage and push the doubled sheet or plate forwardly toward the head 20 and into contact with the previously packed sheets on the truck, so as to force the sheets into packed engagement. The stroke of the head 21 is constant. Therefore, the truck A will be moved forwardly an amount equal to the thickness of the doubled sheet delivered in front of the head on each of its rear strokes.

The clutch pin 37 will automatically enter the groove 36 after the doubled sheet has passed beyond the levers 41, due to the urging of the counter-weighted lever 39, and will retract the clutch member 33 so as to stop the shaft 24 after one complete revolution.

While I have shown and described one specific form of my invention it will be understood that I do not wish to be limited thereto, since various modifications may be made without departing from the scope of my invention, as defined in the appended claims.

I claim—

1. A doubling apparatus for sheets and plates comprising, in combination, a housing having a passageway through its lower end through which a wheeled carrier is adapted to pass, a wheeled carrier adapted to be located in said passageway, said carrier being provided with an upright head at one end to support the doubled sheets or plates delivered onto said carrier, a doubling mechanism mounted on said housing, means for receiving and guiding the doubled sheets or plates onto said carrier, a packing head reciprocably mounted on said housing, said head being adapted to be withdrawn to permit each of the doubled sheets or plates to be delivered onto said carrier and to be moved toward and engage said doubled sheets or plates after they are delivered onto said carrier, power means for reciprocating said head, and means controlled by the doubled sheets or plates as they are being delivered to said carrier for controlling the operation of said head, said head having a constant stroke and being adapted to move said carrier forwardly a distance substantially equal to the thickness of the doubled sheets or plates so as to position said carrier to receive the next doubled sheet or plate.

2. A doubling apparatus for sheets and plates comprising, in combination, a housing having a passageway through its lower end through which a wheeled carrier is adapted to pass, a wheeled carrier adapted to be located in said passageway, said carrier being provided with an upright head at one end to support the doubled sheets or plates delivered onto said carrier, a doubling mechanism mounted on said housing, means for receiving and guiding the doubled sheets or plates onto said carrier, a packing head reciprocably mounted on said housing, said head being adapted to be withdrawn to permit each of the doubled sheets or plates to be delivered onto said carrier and to be moved toward and engage said doubled sheets or plates after they are delivered onto said carrier, said head having a constant stroke and being adapted to move said carrier forwardly a distance substantially equal to the thickness of the doubled sheets or plates so as to position said carrier to receive the next doubled sheet or plate, means for reciprocating said head including a crank-shaft, a connecting rod connecting said shaft and said head, a motor for operating said shaft, and a clutch forming a connection between said shaft and said motor, and means controlled by the doubled sheets or plates as they are being delivered to said carrier for operating said clutch.

3. A doubling apparatus for sheets and plates comprising, in combination, a housing having a passageway through its lower end through which a wheeled carrier is adapted to pass, a wheeled carrier adapted to be located in said passageway, said carrier being provided with an upright head at one end to support the doubled sheets or plates delivered onto said carrier, means for normally resisting movement of said carrier, a doubling mechanism mounted on said housing, means for receiving and guiding the doubled sheets or plates onto said carrier, a packing head reciprocably mounted on said housing, said head being adapted to be withdrawn to permit each of the doubled sheets or plates to be delivered onto said carrier and to be moved toward and engage said doubled sheets or plates after they are delivered onto said carrier, said head having a constant stroke and being adapted to move said carrier forwardly a distance substantially equal to the thickness of the doubled sheets or plates so as to position said carrier to receive the next doubled sheet or plate.

In testimony whereof, I have hereunto set my hand.

ARTHUR R. McARTHUR.